US006500249B1

United States Patent
Dodson

(12) United States Patent
(10) Patent No.: US 6,500,249 B1
(45) Date of Patent: Dec. 31, 2002

(54) CHEMICALLY REACTIVE CONCRETE STAINS

(76) Inventor: Marvin T. Dodson, P.O. Box 1172, El Dorado, AR (US) 71731

(*) Notice: Subject to any disclaimer, the term of this patent is extended or adjusted under 35 U.S.C. 154(b) by 0 days.

(21) Appl. No.: 09/566,757

(22) Filed: May 9, 2000

Related U.S. Application Data

(60) Provisional application No. 60/133,487, filed on May 10, 1999.

(51) Int. Cl.[7] ............................................. C09K 3/00
(52) U.S. Cl. .................. 106/34; 106/286.1; 106/286.3; 106/286.4; 106/286.6; 106/287.18; 106/278.19; 106/286.7
(58) Field of Search ................ 106/34, 286.1, 106/286.3, 276.4, 286.6, 287.18, 287.19, 286.7

(56) References Cited

U.S. PATENT DOCUMENTS 5,286,289 A * 2/1994 Shankman .................. 106/34

* cited by examiner

Primary Examiner—Elizabeth D. Wood
(74) Attorney, Agent, or Firm—Stephen D. Carver

(57) ABSTRACT

Stains and methods of forming stains comprising saturated hydrochloric acid solutions of blended metallic salts that are chemically reactive with masonry concrete, stone, and like materials. The concentrated stains produce a full spectrum of colors derived from earth elements in the metals and transition element group, and from ores, and refined chemicals. Groups of concentrated mixtures emphasize the colors black, yellow, cyan and magenta to produce an overall earth-tone color. By separately dissolving each heavy metal constituent in an acid solution to the point of total saturation or crystallization, and then adding these mixtures to a predetermined base acid mixture, a stable, concentrated stain results. The individual ingredients are blended to produce a chosen color spectrum by adjusting mixture proportions. The end-user controls the darkness of the desired color by extending the concentrated solution with water from four parts per unit volume to as many parts as required, until the desired color is achieved. The end-color is lightened as desired by the user by diluting the mixture with water, varying the purchased mixture from 1:1 to 1:60. Colors produced are natural earth tones with a decorative appearance. The end result yields a finish that is easily maintained and will not chip, peel, or fade. The concentrated solution allows for optimum cost savings during shipping and storage.

10 Claims, 1 Drawing Sheet

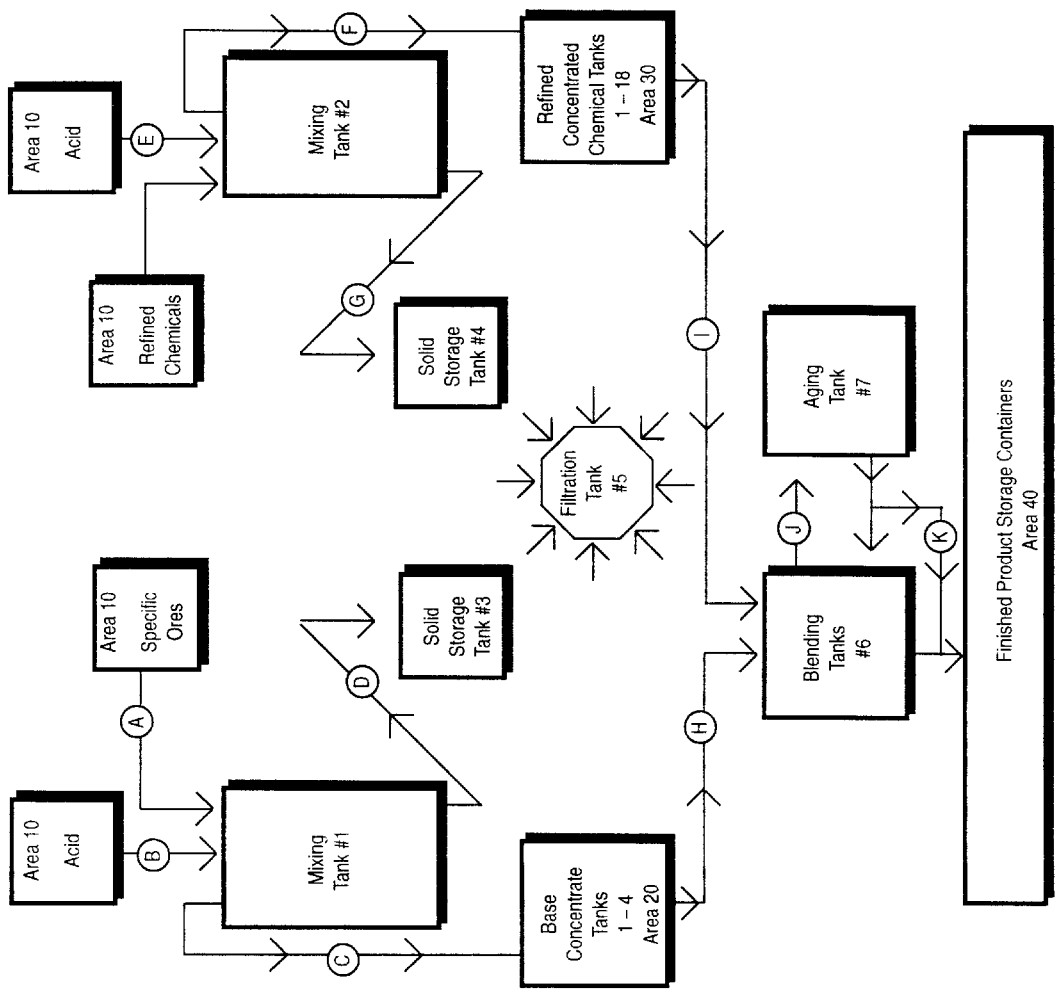

CHEMICALLY REACTIVE CONCRETE STAINS

CROSS REFERENCE TO RELATED APPLICATION

This application claims the benefit of and is based upon, and claims priority under, my copending U.S. Provisional Patent Application Serial No. 60/133,487 filed May 10, 1999.

BACKGROUND OF THE INVENTION

I. Field of the Invention

The present invention relates generally to stains for coloring concrete, masonry, rock, stone and the like. More particularly, the present invention relates to a tinting process and concentrated, acid-based chemical formulations for such a process that, through a chemical reaction caused after application, enables concrete, masonry, stone, and like materials to be colored to greatly enhance the overall aesthetic appearance of the structure.

II. Description of the Prior Art

Concrete and like materials are produced from the alkaline earth metals. Concrete is produced by mixing calcium hydroxide (slaked lime) with sand, gravel, and water. As the water evaporates, the calcium, hydroxide reacts with the carbon dioxide in the air forming calcium carbonate and the mixture hardens into solid material. The calcium carbonate in the mixture is insoluble in water but reacts readily with most acids.

The vast majority of decorative stains available and commercially known in the prior art have been composed of pigments or stain along with some type of applicable carrier base such as water or solvent. These types of stains are commonly used on masonry, concrete and similar surfaces. For example, an antique effect is established on such surfaces by using suitable colors applied to simulate the qualities and/or overall aesthetic appearance desired. A variation of color tone may be accomplished from applications of pigmented washes. Such latter appearances are common throughout the Mediterranean regions of the world and are now widely imitated architectural coatings. In the aforementioned prior art stain applications, the colors most commonly employed are what is known as earth tones including terra cotta tints and others.

Conventional painting and staining techniques provide a single tone or color over a masonry or like surface. In order to arrive at an antique or washed effect, numerous applications of shaded and/or color pigments are applied until the desired effect is attained. When prior art pigments, pairs, stains, and the like are conventionally applied to an exposed masonry surface, it is difficult to create an appropriate appearance.

For new concrete compositions, the use of an intrinsic color mixed into the cement is known. However, in order to accomplish this, a coloring agent is mixed with the concrete blend. Afterwards, a thorough clean-up of the applicator equipment is necessary, resulting in considerable labor and expense.

Conventional acid based stains have been around for a long time and come in a premixed, ready-to-use format with a limited color range. No known prior art stain is available in the concentrated form I have proposed.

SUMMARY OF THE INVENTION

The present stains comprise concentrated hydrochloric acid solutions of blended metallic salts that are chemically reactive with calcium carbonate and other stone-like materials. The stains, in effect, etch and penetrate into the surface of the material being treated as the acid reacts with the calcium carbonate or like surface material in rocks, stones, or cementitious materials. The rate of the chemical reaction and color achieved will depend on the concentration of the acid solution when applied. When all of the acid has been neutralized by reacting with the calcium carbonate in the concrete, the reaction stops, leaving a permanent color embedded in the concrete. The coloration achieved with my stains and process is not a mere surface coating or film.

The end-user controls the desired color by extending the concentrated stain with water. Varying the amount of water added to the concentrate will produce shades, tones, and tint colors from extremely dark to, very light, thus producing a range of natural colors with a decorative appearance. A single application of the present invention produces natural color variations whereas the wet overlaying of several different concentrates produces a wide range of color variation. Allowing the colors to dry independently of each other produces a more defined color separation. The spectrum of colors are remarkably effective in enhancing old concrete sidewalks and buildings without expensive cleaning and restoration; they are equally effective on new concrete. The concentrated acid solution of blended metallic salts and ores allows for optimum cost savings in shipping and storage.

In the best mode, each concentrated solution comprises and plurality of mixtures of concentrated heavy metals in concentrated acidic solution(s), to emulate the four primary colors encountered in color printing theory. Thus portions of the end-users mixture create the colors black, yellow, cyan and magenta in a proportion that results in a desired overall earth-tone color.

Using a mixing vessel formed from high strength material resistant to concentrated or strong solutions of acids, four base concentrates are formulated by reacting the natural minerals in specific ores with a concentrated acid solution. Various other concentrates are produced by the reaction of various metals and/or refined chemicals such as the salts of copper, iron, magnesium, manganese, nickel, vanadium, barium, chromium, etc., using the same method as the fout base concentrate. Each of the concentrates, is stored in individual containers until ready for processing Previously it was though that use of four base concentrates as a starting point was preferable (i.e., the best lode). Since filing my provisional application I have discovered that a more highly-concentrated product may be mixed, according to my theory, without the base mixture, by concentrating on the colors black, yellow, cyan and magenta. The color-producing blends are formulated using various mixtures of either concentrates and metallic salts. Concentrates in a variety of colors are produced, including, but not limited to: blue/blue green, green/dark green, brown with reddish overtones, amber/buff, aged copper/bronze, mocha/ dirk brown, gray green/dark gray, black, red orange/orange brown, etc. In a preferred embodiment of the present invention to be described, hereinafter, in greater detail, a concentrated acid solution of blended metallic salts, chemically reactive with masonry, concrete, and other like materials, is most desirable to the end-user. By having the option of extending the concentrate with water until the choice hue is attained, the applicator controls the desired color. Also, the concentrated solution allows for optimum cost savings during shipping and storage.

Thus a basic object of any invention is to provide highly efficient stains, and an efficient staining methods, for coloring concrete, stone, rock or masonry surfaces.

A related object is to provide highly efficient stains of the character described that are extremely resistant to fading.

Another object is to provide highly efficient stains that produce a variety of earth-tones, and to produce methods of making or mixing such stains.

Another important object is to provide a stain that chemically reacts with the treated material to provide a tougher exterior.

A basic object is to tint stone and masonry structures and to provide an aesthetically desirable spectrum of shade, tone, and tint color.

Another object is to provide concentrated stains that require less volume in storage and in shipping than prior art stains.

A further object is to provide a reliable tinting system that is not a mere surface coating or film that can be easily removed or marred.

Yet another object is to provide stain that will not peel or flake over a period of time.

A related object is to provide stains of the character described that are highly wear resistant.

An important object is to provide a number of stain formulations of the character described that will yield a wide variety of desirable colors and tints.

A related object is to formulate concentrated stains in a way that allows them to interact with each other to greatly expand the available color spectrum, allowing greater creative freedom than the prior art. It is a feature of this invention that coloring agents are formed from specific mixtures of heavy metals and acids to promote coloration in the four colors regions of yellow, black, magenta and cyan.

A further object is to provide concentrated stains that allow reconstitution with any potable water source.

A further object is to provide a concentrated stain that allows reconstitution with distilled or filtered water to more precisely control the resultant color.

Another important object is to provide a stain that is adaptable to a wide variety of concrete, stone and masonry surfaces.

Yet another object is to provide stain products of the character described that may be applied through a variety of different methods of application to suit the needs of the user.

A related object is to provide a stain with a reaction that varies depending on different properties of different concrete, stone and masonry surfaces to provide unique color variations.

Another object is to provide a number of stain formulations with an adjustable concentrate-to-stain ratio of from 1:1 to 1:60 to provide a stain that is adjustable to the different properties of different concrete, stone and masonry surfaces to produce the desired color.

These and other objects and advantages of the present invention, along with features of novelty appuntenant thereto, will appear or become apparent in the course of the following descriptive sections.

BRIEF DESCRIPTION OF THE DRAWING

The appended drawing, which forms a part of the specification and which is to be construed in conjunction therewith, is a block diagram of the best mode of the preferred process.

DETAILED DESCRIPTION

In the preferred embodiment of the present invention, "base concentrates" are first formulated by the reaction of concentrated or strong acid solutions with specific ores, minerals or refined chemicals obtained from various areas or sources. Using special tanks resistant to strong acids, the four base concentrates are dissolved by the reaction of concentrated or strong acid solutions with the ores or refined chemicals Constituent ores include, but are not limited to Iron Ore and Arkansas Black Shale Ore. It is these ores or refined chemicals that will, ultimately, define the final color spectrum that the stain produces. It is also the formulation of the base concentrates that allows the stains to be used together to create a wider variety of color and design possibilities. Each one is processed and treated separately in mixing tanks containing a strong acid solution. In the best mode, the mixing process starts with the base concentrates, to which all other ingredients are subsequently added.

When all reactor has, ceased, the circulation is stopped and all unaffected material is allowed to settle to the bottom of the tank. The liquids are extracted from the tanks and stored in individual containers and labeled (1) through (4). The solids are treated in accordance with EPA standards for disposal or they are treated until completely dissolved or saturated.

Other concentrates are produced by the reaction of various metal and/or refined chemicals such as the salts of copper, iron, manganese, nickel, vanadium, chromium, barium, etc., and rare earth metals, using the same method as preparation of the four base concentrates. Each concentrate is stored in individual containers resistant to strong acids until ready to mix into the color spectrum formulas. The preferred acids for the present invention are hydrochloric, phosphoric, and/or sulfuric acid.

From the four base concentrates, all of the spectrum colors are formulated using a mixture of specific concentrates of metals and/or metallic salts in quantities as required to achieve the desired range of colors. Concentrates in a variety of colors are formulated including, but not limited to: blue/blue green, green/dark green, brown with reddish overtones, dark grey/blank with greenish overtones, amber/buff, aged copper/bronze, black, red orange/orange brown, mocha/dark brown, etc. Concentrated stains are unique in that they are formulated to interact with each other on masonry concrete and other like material surfaces, allowing unlimited creative freedom. Color will be unique for each application and will last the life of the concrete. The end-user controls the desired shade, tone or tint of the chosen color by diluting the (concentrated acid solution of blended metallic salts with water. Varying the amount of water added to the concentrate will expand the range of color from an extremely dark shade to a light tint thus producing a range of colors with a architectural and aesthetically decorative appearance. Optimum savings in shipping and storage costs result when the end-user furnishes and controls the amount of water added to develop the desired color spectrum.

The storage area for the four specific ores, acids, and refined chemicals used in the process will be referred to as area 10. The ores are transferred from area 10 via conveyer line A to mixing tank #1. The mixing tank is filled approximately ⅓ full of ore. Acid from area 10 is added via line B to mixing tank #1 until the volume of acid and ore in the tank is approximately ¾ full. The ore and acid are slowly mixed by mechanical means. Any gases produced during the reaction are vented to filtration tank #5 containing water. When all reaction has stopped, the mixing is stopped and solids remaining are allowed to settle in the bottom of the mixing tank. The liquid is drawn off via line C to holding tank area 20 for processing into the color spectrum formula. The solids are transferred via line D to holding tank #3 for proper treatment and disposal. Each of the four base concentrates are prepared in the same manner and stored in individual tanks.

A predetermined amount of acid from area 10 is added to mixing tank #2 via line E. While slowly mixing the acid via mechanical means the chemical salt is added manually to the acid. Approximately two to five pounds of the chemical salt are added per gallon of acid. The amount of chemical salt added is dependent on the particular salt being processed. Any gases produced during the reaction are vented to filtration tank #5 containing water. When all reaction has stopped, the mixing is stopped and any solids remaining are allowed to settle in the bottom of the tank. The liquid is drawn off via line F to holding tank area 30 for processing into the color spectrum formula. Any solids remaining are removed via line G and retained in solid storage tank #4 for further processing. Each of the refined chemical salts used in formulating the various colors are prepared individually by the above method and stored in individual containers until ready for blending into the various colors. The storage area for the four base concentrates produced from the specific ores and identified as base concentrates (1) through (4) will be designated as area 20. The storage area for concentrates produced from the various refined chemical salt and properly identified will be designated as area 30.

The base concentrates from area 20 are transferred to blending tank #6 via line H. The chemical salt concentrates from area 30 are transferred via line I to blending tank #6. The mixture of concentrates, using special tanks resistant to strong acids is blended together by mechanical means. Gases produced during blending are vented to filtration tank #5 containing water. After blending, the finished product is transferred via line J to aging tank #7 before transferring back to blending tank #6 or area 40 to finished product containers via line K. This is to ensure that all chemical reaction has ceased and no gases will be discharged during shipping. In all cases the base mixture is mixed first, followed by the additional listed ingredients.

The following examples will demonstrate that a variety of colors can be achieved by various mixtures of the four base concentrates and concentrates of the blended metallic salts. The examples are merely illustrative and not intended to be construed as limiting application of the present invention.

EXAMPLE 1

A yellow/gold color is formulated with the following concentrated ingredients:

TABLE 1

| | Formulation of Example 1 | | |
|---|---|---|---|
| Ingredients | # per gallon | Acid | Approx. pH |
| Red Iron Oxide | 3 | Hydrochloric | 2.18 @ 21.8° C. |
| Yellow Iron Oxide | 3 | Hydrochloric | 2.27 @ 21.7° C. |
| Sodium Dichromate | 5 | Water | 1.63 @ 22.2° C. |
| Base Concentrate #1 | 4 | Hydrochloric | 1.68 @ 21.9° C. |

The final blend is as follows: Two parts of base concentrate #1, six parts concentrate containing red iron oxide, two parts concentrate containing yellow iron oxide, eight parts sodium dichromate and one part surfactant are added to the blending tank. After blending the color formula is transferred to aging tank. The observed pH of the final blend was approximately 1.12 @24.71° C. The red iron oxide promotes brown, or the magenta-cyan area of color. The yellow iron oxide promotes yellowing. The sodium dichromate blackens the mixture after blending.

The resultant specific gravity measured 1.8 to 2.1. The approximate pH when potable water was added to concentrated solution was as follows:

1 part concentration+4 parts water—pH 0.45 @22.81° C.

1 part concentration+9 parts water—pH 0.07 @23.21° C.

1 part concentration+18 parts water+1 part HCL—pH 0.14 @24.51° C.

The observed results will vary slightly depending on chemical make-up of water used, with distilled or filtered eater recommended. The base concentrate comprises a saturated mixture of hydrochloric acid and brown iron oxide.

EXAMPLE 2

A brown color is formulated with the concentrated ingredients:

TABLE 2

| | Formulation of Example 2 | | |
|---|---|---|---|
| Ingredients | # per gallon | Acid | Approx pH |
| Commerical Ferric Chloride Solution | (liquid) | Hydrochloric | 1.48 @ 21.5° C. |
| Manganese Chloride | 4 | Hydrochloric | 5.22 @ 22.1° C. |
| Manganese Oxide | 2 | Hydrochloric | 1.94 @ 21.4° C. |
| Base Concentrate #2 | 3 | Hydrochloric | 2.30 @ 21.8° C. |
| Sulfuric Acid | (Liquid) | Sulfuric | 1.63 @ 21.7° C. |

The final blend is a follows: Two parts of base concentrate #2, six parts ferric chloride solution, four parts manganese chloride, four parts manganese oxide and one part concentrated sulfuric acid are added to the blending tank. After blending the color formula is transferred to an aging tank. The pH of the final blend was approximately 2.20 @23.21° C. The specific gravity was 2.1 to, 2.3. The manganese chloride promotes cyan. The manganese oxide and commercial chloride solution promote a magenta coloring. The sulfuric acid promotes yellowing.

The approximate pH when potable water was added to the concentrated solution is as follows:

1 part concentration+4 parts water—pH 0.53 @27.51° C.

1 part concentration+9 parts water—pH 0.07 @24.71° C.

1 part concentration+18 parts water+1 part HCL—pH 0.28 @25.81° C.

The observed results will vary slightly depending on the chemical make-up of the water used; for example, distilled or filtered water is best. Further, lighter hues are obtained by the applicator simply by diluting the concentrated stain at the job site. The base concentrate comprises a saturated mixture of hydrochloric acid and barium or barite ore.

EXAMPLE 3

The light gray to greenish gray color is formulated with the following concentrated ingredients:

TABLE 3

| | Formulation of Example 3 | | |
|---|---|---|---|
| Ingredients | # per gallon | Acid | Approx pH |
| Commerical Ferric Chloride Solution | (liquid) | Hydrochloric | 1.48 @ 21.6° C. |
| Manganese Chloride | 4 | Hydrochloric | 5.22 @ 22.4° C. |
| Manganese Oxide | 2 | Hydrochloric | 1.94 @ 21.6° C. |

TABLE 3-continued

Formulation of Example 3

| Ingredients | # per gallon | Acid | Approx pH |
|---|---|---|---|
| Cupric Chloride | 4 | Hydrochloric | 0.44 @ 21.8° C. |
| Base Concentrate #3 | 3 | Hydrochloric | 2.37 @ 21.7° C. |
| Sulfuric Acid | Liquid | Sulfuric | 1.63 @ 21.7° C. |

The final blend is as follows: Two parts of base concentrate #3, four parts manganese chloride, four parts manganese oxide, four parts cupric chloride, one part ferric chloride solution and one part concentrated sulfuric acid are added to the blending tank. After blending the color formula is transferred to the aging tank. The pH of the final blend was approximately 2.17 @23.41° C. The specific gravity was 2.2 to 2.5. The manganese chloride and cupric chloride promotes cyan coloring. The manganese oxide and commercial chloride solution promote a magenta coloring. Sulfuric acid tends to yellow the mixture.

The approximate pH when potable water was added to the concentrated solution was as follows:

1 part concentration+4 parts water—pH 0.45 @26.11° C.

1 part concentration+9 parts water—pH 0.06 @24.51° C.

1 part concentration+18 parts water+1 part HCL—pH 0.24 @25.41° C.

The results will vary slightly depending upon the water used. The base concentrate comprises Arkansas black sat; in a saturated mixture of hydrochloric acid.

EXAMPLE 4

A light gray color with golden undertones to a dark gray color with greenish/gold undertones is formulated with the following concentrated ingredients:

TABLE 4

Formulation of Example 4

| Ingredients | # per gallon | Acid | Approx pH |
|---|---|---|---|
| Black Iron Oxide | 3.5 | Hydrochloric | 1.02 @ 22.5° C. |
| Sodium Dichromate | 5 | Water | 1.63 @ 22.2° C. |
| Vanadium Trioxide | 3 | Hydrochloric | 1.12 @ 23.2° C. |
| Hydrochloric Acid | | Hydrochloric | 2.12 @ 20.9° C. |
| Base Concentrate #4 | | Hydrochloric | 1.73 @ 21.7° C. |

The final blend is as follows: One part of base concentrate #4, four parts black iron oxide, four parts sodium dichromate, four parts vanadium trioxide and two parts hydrochloric acid are added to the blending tank. After blending the color formula is transferred to the aging tank. The pH of the final blend was approximately 1.24 @25.51° C. The specific gravity was 2.23 to 2.41. The base concentrate comprises hydrochloric acid. The black iron oxide promotes dark magenta coloring. The sodium dichromate promotes blacks or darkening. The vanadium trioxide produces light magenta coloring. Sulfuric acid tends to yellow the mixture The approximate pH when potable water was added to a concentrated solution was as follows:

1 part concentration+4 parts water—pH 0.27 @24.21° C.

1 part concentration+9 parts water—pH 0.04 @23.31° C.

1 part concentration+18 parts water+1 part HCL—pH 0.15+@24.51° C.

Results will vary slightly depending on chemical make-up of water used.

EXAMPLE 5

A greenish color is formulated with the following concentrated ingredients:

TABLE 5

Formulation of Example 5

| Ingredients | # per gallon | Acid | Approx. pH |
|---|---|---|---|
| Copper Chloride | 5 | Hydrochloric | 2.18 @ 21.8° C. |
| Base Concentrate #5 | 85% liquid | Phosphoric | 1.68 @ 21.9° C. |

The final blend is as follows: One part of base concentrate #5, nine parts of copper chloride are added to the blending tank with a conventional surfactant or wetting agent. After blending, the color formula is transferred to the aging tank. The observed pH of the final blend was approximately 1.1–1.5 @24.71° C. The resultant specific gravity measured 1.8 to 2.1. Copper chloride promotes the blues and greens, i.e., cyan. The phosphoric acid base promotes stability and yellowing. The approximate pH when potable water was added to concentrated solution was as follows:

1 part concentration+4 parts water—pH 0.5 @22.81° C.

1 part concentration+9 parts water—pH 0.1 @23.21° C.

1 part concentration+18 parts water+1 part HCL—pH 0.04 @24.51° C.

The observed results will vary slightly depending on chemical make-up of water used, with distilled or filtered water recommended.

Preferred Application Methods

The stain can be applied by either spray or brush on the concrete or masonry. For best results a heavy layer of stain needs to be applied to the surface. The method of application will effect the final outcome. Spraying on the stain will create a more natural look. Where brushing on and evening out the stain will create a more uniform outcome.

Each concentrate is designed to create variable shades. This is achieved by changing the concentrate-to-water ratio. For example, one part concentrate and four parts water is significantly darker than the same one part concentrate with eighteen parts water. All ratios between these two examples have proved successful. Further testing has shown that the addition of one part HCL added to ratios exceeding 1:1 to 14:1 greatly improve the functionality of the stain on aged concrete. Recently experiments have revealed that ratios of 1:24 to 1:45 on green concrete work best.

The use of multiple coats involving different stains has also been tested, and this creates an even greater variety of successful color choices.

In all cases it is important that, when diluting the mixture, proper water quality be maintained. Distilled or filtered water is recommended in the best mode. Job site water with unknown impurities can appreciably alter the expected coloration and hue or intensity.

From the foregoing, it will be seen that this invention is one well adapted to obtain all the ends and objects herein, set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention(s), I claim:

1. An acid-based, earth-tone stain for coloring rocks, stones, and cementitious materials, said system comprising:
    (a) a blend formed by mixing together two or more of a plurality of saturated, hydrochloric acid base solutions in a desired proportion, each base solution comprising a pH of approximately 1 or less, and each base solution comprising dissolved, heavy metals for inducing a particular dark earth tone color when the stain is thereafter applied to said rocks, stones, or cementitious materials;
    (b) wherein a first base solution comprises a dissolved heavy metal salt selected from the group comprising black iron oxide, manganese oxide, sodium dichromate, and Arkansas black shale ore;
    (c) wherein a second base solution comprises a dissolved heavy metal salt selected from the group comprising commercial red iron oxide, black iron oxide, yellow iron oxide, manganese oxide, manganese chloride, vanadium trioxide, cupric chloride, ferric chloride solution, and iron ore;
    (d) wherein a third base solution comprises a dissolved heavy metal salt selected from the group comprising red iron oxide, manganese chloride, and cupric chloride;
    (e) wherein a fourth base solution comprises a dissolved heavy metal salt selected from the group comprising yellow iron oxide, sulfuric acid, sodium dichromate, barium sulfate, phosphoric acid and vanadium trioxide; and,
    (f) wherein the resulting color caused by application of the stain is varied between a darkest and lightest form by diluting the blend with water at the job site at a ratio of at least 1:1 and up to a ratio of 1:60 by volume.

2. The stain as defined in claim 1 wherein, to make the color brown, said blend comprises approximately eight parts by volume of said first base solution, approximately eight parts by volume of the second base solution, and approximately one part by volume of said third base solution.

3. The stain as defined in claim 1 wherein, to make a light gray to greenish gray color, said blend comprises approximately four parts by volume of the first base solution, approximately five parts by volume of the second base solution, approximately four parts by volume of the third base solution and approximately three parts by volume of the fourth base solution.

4. The stain as defined in claim 1 wherein, to make a light gray color with golden undertones, the blend comprises approximately eighteen parts by volume of the first base solution, and approximately two parts by volume of the second base solution.

5. The stain as defined in claim 1 wherein, to make a greenish color, the blend comprises approximately nine parts by volume of the third base solution, and one part by volume of the fourth base solution.

6. A method of staining rocks, stones, and cementitious materials with an acid based stain to produce a wide variety of earth tone colors, said method comprising the steps of:
    (a) providing a plurality of saturated, hydrochloric acid base solutions, each base solution comprising a pH of approximately 1 or less, and each base solution comprising dissolved, heavy metals for inducing a particular dark earth tone color when the stain is thereafter applied to said rocks, stones, or cementitious materials, said last mentioned step comprising the steps of:
        (i) providing a first base solution comprises a dissolved heavy metal salt selected from the group comprising black iron oxide, manganese oxide, sodium dichromate, and Arkansas black shale ore;
        (ii) providing a second base solution comprises a dissolved heavy metal salt selected from the group comprising commercial red iron oxide, black iron oxide, yellow iron oxide, manganese oxide, manganese chloride, vanadium trioxide, cupric chloride, ferric chloride solution, and iron ore;
        (iii) providing a third base solution comprises a dissolved heavy metal salt selected from the group comprising red iron oxide, manganese chloride, and cupric chloride;
        (iv) providing a fourth base solution comprises a dissolved heavy metal salt selected from the group comprising yellow iron oxide, sulfuric acid, sodium dichromate, barium sulfate, phosphoric acid and vanadium trioxide; and,
    (b) blending a blend by mixing together two or more of said base solutions in a desired proportion that enables said stain, when applied to rocks, stones, or cementitious materials, to produce a desired earth tone color; and,
    (c) varying the desired color between a darkest and lightest form by diluting the blend with water at the job site at a ratio of at least 1:1 and up to a ratio of 1:60 by volume to produce said stain.

7. The method as defined in claim 6, wherein, to make the color brown, said blending step combines approximately eight parts by volume of said first base solution, approximately eight parts by volume of the second base solution, and approximately one part by volume of third base solution.

8. The stain as defined in claim 6, wherein, to make a light gray to greenish gray color, said blending step combines approximately four parts by volume of the first base solution, approximately five parts by volume of the second base solution, approximately four parts by volume of the third base solution and approximately three parts by volume of the fourth base solution.

9. The stain as defined in claim 6, wherein, to make a light gray color with golden undertones, said blending step combines approximately eighteen parts by volume of the first base solution, and approximately two parts by volume of the second base solution.

10. The stain as defined in claim 6 wherein, to make a greenish color, said blending step combines approximately nine parts by volume of the third base solution, and one part by volume of the fourth base solution.

* * * * *